US012280671B2

United States Patent
Ito et al.

(10) Patent No.: US 12,280,671 B2
(45) Date of Patent: Apr. 22, 2025

(54) HYBRID ELECTRIC VEHICLE CONTROLLER AND METHOD FOR CONTROLLING HYBRID ELECTRIC VEHICLE

(71) Applicant: TOYOTA JIDOSHA KABUSHIKI KAISHA, Aichi-ken (JP)

(72) Inventors: Hisashi Ito, Toyota (JP); Takehiro Komatsu, Toyota (JP); Masanao Idogawa, Nagoya (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 201 days.

(21) Appl. No.: 18/158,473

(22) Filed: Jan. 24, 2023

(65) Prior Publication Data
US 2023/0242091 A1    Aug. 3, 2023

(30) Foreign Application Priority Data
Jan. 28, 2022   (JP) .................................. 2022-011979

(51) Int. Cl.
| | | |
|---|---|---|
| *B60K 6/387* | (2007.10) | |
| *B60W 10/02* | (2006.01) | |
| *B60W 10/08* | (2006.01) | |
| *B60W 20/16* | (2016.01) | |
| *B60W 30/192* | (2012.01) | |

(52) U.S. Cl.
CPC ............. *B60K 6/387* (2013.01); *B60W 10/02* (2013.01); *B60W 10/08* (2013.01); *B60W 20/16* (2016.01);
(Continued)

(58) Field of Classification Search
CPC ...... B60W 20/16; B60W 10/02; B60W 10/08; B60W 30/192; B60W 2510/068;
(Continued)

(56) References Cited

U.S. PATENT DOCUMENTS

| | | | |
|---|---|---|---|
| 2013/0204478 A1 | 8/2013 | Watanabe et al. | |
| 2015/0122203 A1* | 5/2015 | Ideshio ................... | F02D 25/02 123/2 |

(Continued)

FOREIGN PATENT DOCUMENTS

| | | | | |
|---|---|---|---|---|
| JP | 2009156293 A | * | 7/2009 | |
| JP | 2011-218914 A | | 11/2011 | |
| JP | 2012-087639 A | | 5/2012 | |
| JP | 4973374 B2 | * | 7/2012 | ............... B60K 6/48 |

(Continued)

OTHER PUBLICATIONS

Translated and original of JP2009156293 (Year: 2009).*
Original and translation of JP4973374 (Year: 2012).*
Original and translation of JP2020093560 (Year: 2020).*
Translated and original of JP2021160683 (Year: 2021).*

*Primary Examiner* — Michael D Lang
(74) *Attorney, Agent, or Firm* — HAUPTMAN HAM, LLP

(57) ABSTRACT

A controller for a hybrid electric vehicle. The hybrid electric vehicle includes an engine, a motor generator, a clutch arranged between a crankshaft and the motor generator, and a catalyst arranged in an exhaust passage. The controller includes first processing circuitry that executes a catalyst warming process that warms the catalyst under a situation in which the hybrid electric vehicle is at a standstill and second processing circuitry configured to control the clutch and the motor generator. The first processing circuitry requests the second processing circuitry to prohibit disengagement of the clutch when the catalyst warming process is executed.

9 Claims, 2 Drawing Sheets

(52) U.S. Cl.
CPC ... *B60W 30/192* (2013.01); *B60W 2510/0208* (2013.01); *B60W 2510/068* (2013.01); *B60W 2510/083* (2013.01); *B60W 2710/021* (2013.01)

(58) Field of Classification Search
CPC ..... B60W 2510/083; B60W 2710/021; B60W 10/06; B60W 30/1884; B60W 2510/0208; B60W 2520/04; B60W 20/50; B60W 30/18054; B60K 2006/4825; B60K 6/48; B60K 6/387; B60Y 2300/474; Y02T 10/62

See application file for complete search history.

(56) References Cited

U.S. PATENT DOCUMENTS

2019/0366827 A1* 12/2019 Tsuchiyama .......... B60W 10/06
2021/0309204 A1* 10/2021 Isami .................... B60W 10/08

FOREIGN PATENT DOCUMENTS

| | | | | |
|---|---|---|---|---|
| JP | 2014094691 | A | 5/2014 | |
| JP | 2017047823 | A | 3/2017 | |
| JP | 2020093560 | A * | 6/2020 | ............ B60W 10/02 |
| JP | 2021160683 | A * | 10/2021 | ............... B60K 6/26 |

* cited by examiner

HYBRID ELECTRIC VEHICLE CONTROLLER AND METHOD FOR CONTROLLING HYBRID ELECTRIC VEHICLE

RELATED APPLICATIONS

The present application claims priority of Japanese Application Number 2022-011979 filed on Jan. 28, 2022, the disclosure of which is hereby incorporated by reference herein in its entirety.

BACKGROUND

1. Field

The following description relates to a hybrid electric vehicle controller and a method for controlling a hybrid electric vehicle.

2. Description of Related Art

Japanese Laid-Open Patent Publication No. 2014-94691 describes a controller applied to a hybrid electric vehicle that includes an engine, a motor generator, a clutch arranged between the crankshaft of the engine and the motor generator, and a starter motor. To warm a catalyst arranged in the exhaust passage of the engine when the clutch is in a disengaged state disconnecting the motor generator from the crankshaft, the controller operates the engine while using a starter motor to apply load to the engine.

A hybrid electric vehicle including a clutch arranged between the crankshaft and the motor generator may not have a starter motor. Such a hybrid electric vehicle cannot apply a large load to the engine when warming the catalyst when the clutch is in a disengaged state. As a result, when the engine is operated to warm the catalyst, the engine speed, which is the rotation speed of the crankshaft, will increase rapidly.

Such a situation may also occur even if a hybrid electric vehicle includes a starter motor. Specifically, when the starter motor cannot be normally actuated due to, for example, an anomaly in the starter motor, the starter motor will not be able to apply a suitable load to the engine. Thus, the engine speed may increase rapidly when the catalyst is warmed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a hybrid electric vehicle controller for a hybrid electric vehicle is provided. The hybrid electric vehicle includes an engine that includes a crankshaft and an exhaust passage, a motor generator, a clutch arranged between the crankshaft and the motor generator, and a catalyst arranged in the exhaust passage. The hybrid electric vehicle controller includes first processing circuitry configured to execute a catalyst warming process that warms the catalyst under a situation in which the hybrid electric vehicle is at a standstill and second processing circuitry configured to control the clutch and the motor generator. The first processing circuitry is configured to request the second processing circuitry to prohibit disengagement of the clutch when the catalyst warming process is executed.

In another general aspect, a method for controlling a hybrid electric vehicle is provided. The hybrid electric vehicle includes an engine that includes a crankshaft and an exhaust passage, a motor generator, a clutch arranged between the crankshaft and the motor generator, and a catalyst arranged in the exhaust passage. The method includes executing a catalyst warming process that warms the catalyst under a situation in which the hybrid electric vehicle is at a standstill, controlling the clutch and the motor generator, and requesting prohibition of disengagement of the clutch when the catalyst warming process is executed.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A hybrid electric vehicle controller according to one embodiment will now be described with reference to FIGS. 1 to 3.

Figure 1:
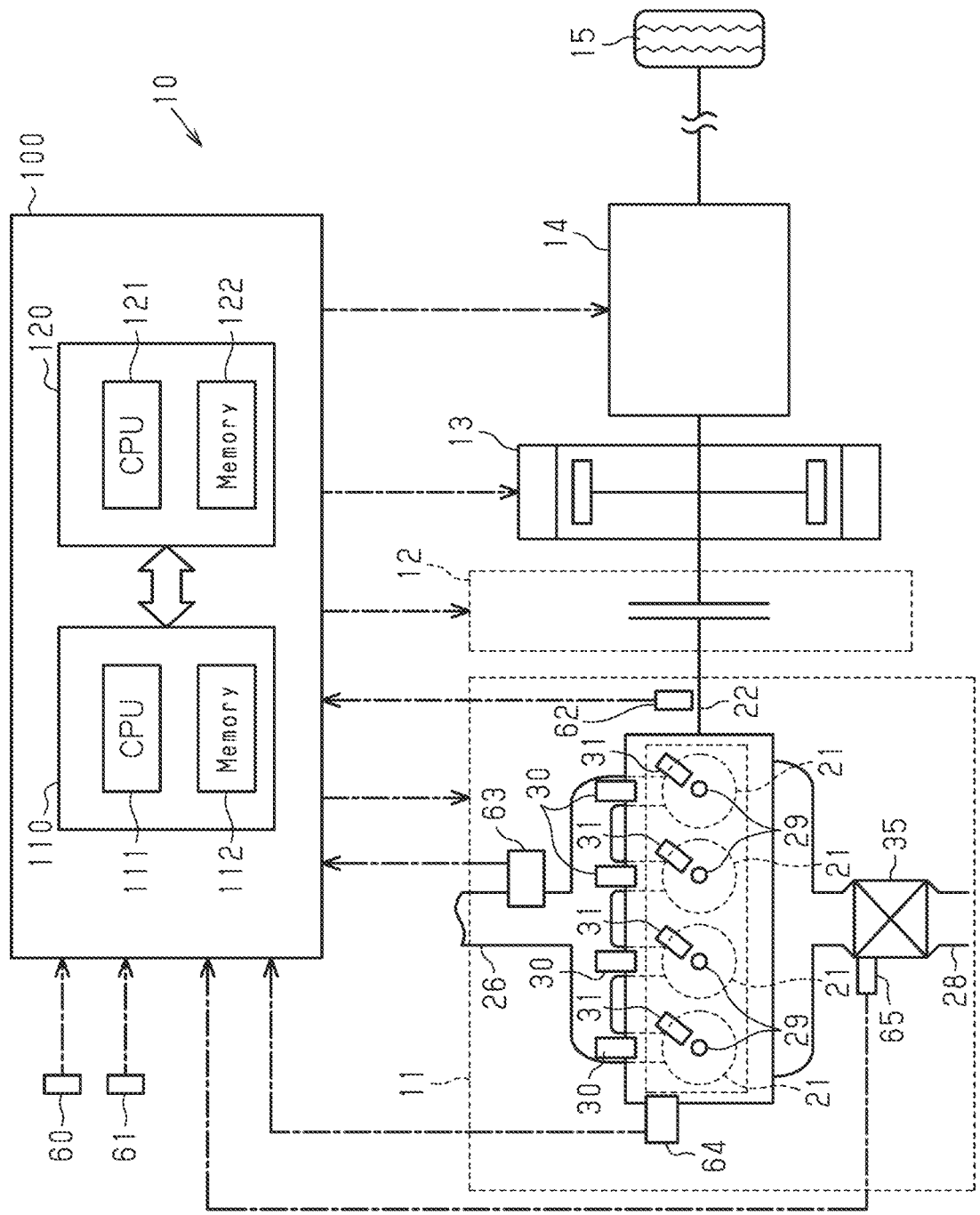
FIG. 1 is a diagram showing a hybrid electric vehicle controller according to one embodiment and a drive system of a hybrid electric vehicle.

FIG. 1 schematically shows the structure of a hybrid electric vehicle 10. The hybrid electric vehicle 10 includes a drive system of the hybrid electric vehicle 10 and a controller 100 that controls the drive system. In the present embodiment, the controller 100 corresponds to the hybrid electric vehicle controller.

Drive System of Hybrid Electric Vehicle 10

The drive system of the hybrid electric vehicle 10 includes an engine 11, a clutch 12, a motor generator 13, a transmission 14, and a drive wheel 15. The clutch 12 is arranged between the engine 11 and the motor generator 13 in the power transmission path. The transmission 14 is arranged between the motor generator 13 and the drive wheel 15. In the present embodiment, the drive system does not include a starter motor.

The engine 11 includes cylinders 21 and a crankshaft 22. The cylinders 21 accommodate pistons and the crankshaft 22 is rotated in synchronization with the reciprocation of the pistons.

The engine 11 includes an intake passage 26 and an exhaust passage 28. Intake air flowing through the intake passage 26 is drawn into the cylinders 21. The amount of intake air flowing through the intake passage 26 is adjusted by the open degree of the throttle valve. Gas discharged from the cylinders 21 flows through the exhaust passage 28. The exhaust passage 28 includes an oxygen storage catalyst 35.

The engine 11 includes spark plugs 29 and fuel injection valves. In the example shown in FIG. 1, each cylinder 21 is provided with a spark plug 29. In the example shown in FIG. 1, the fuel injection valves each include a port injection valve 30 that injects fuel into the intake passage 26 and an in-cylinder injection valve 31 that injects fuel into the corresponding cylinder 21. Thus, each cylinder 21 is provided with a port injection valve 30 and an in-cylinder injection valve 31. In the cylinder 21, a mixture of the fuel injected from at least one of the port injection valve 30 and the in-cylinder injection valve 31 and the intake air drawn from the intake passage 26 into the cylinder 21 is burned when ignited by a spark discharge of the spark plug 29. Exhaust gas generated by the combustion of the air-fuel mixture is discharged from the cylinder 21 into the exhaust passage 28.

The clutch 12 connects the crankshaft 22 to the motor generator 13. The actuation of the clutch 12 is controlled by the controller 100. The clutch 12 may be hydraulically driven or electromagnetically driven. When the clutch 12 engages the crankshaft 22 and the motor generator 13, the motor generator 13 is connected to the crankshaft 22. Thus, when the clutch 12 is in an engaged state, the crankshaft 22 can be rotated by driving the motor generator 13. When the clutch 12 is in a disengaged state, the motor generator 13 is disconnected from the crankshaft 22.

Controller 100

The controller 100 receives detection signals from various types of sensors arranged in the hybrid electric vehicle 10. For example, the controller 100 receives detection signals from a speed sensor 60, an accelerator position sensor 61, a crank angle sensor 62, an air flowmeter 63, a coolant temperature sensor 64, and a catalyst temperature sensor 65. The speed sensor 60 detects a vehicle speed SP, which is the traveling speed of the hybrid electric vehicle 10, and outputs a detection signal in accordance with the detection result. The accelerator position sensor 61 detects an accelerator position AC, which is the position of the accelerator pedal, and outputs a detection signal in accordance with the detection result. The crank angle sensor 62 detects an engine speed Ne, which is the rotation speed of the crankshaft 22, and outputs a detection signal in accordance with the detection result. The air flowmeter 63 detects an intake air amount GA, which is the amount of intake air flowing through the intake passage 26, and outputs a detection signal in accordance with the detection result. The coolant temperature sensor 64 detects an engine coolant temperature Twt, which is the temperature of the coolant circulating through the engine 11, and outputs a detection signal in accordance with the detection result. The catalyst temperature sensor 65 detects a catalyst temperature Tc, which is the temperature of the catalyst 35, and outputs a detection signal in accordance with the detection result. The controller 100 controls the engine 11, the clutch 12, the motor generator 13, and the transmission 14 based on the detection signals received from the sensors.

The controller 100 includes a first execution unit 110 that controls operation of the engine 11 and a second execution unit 120 that controls the clutch 12 and the motor generator 13. The first execution unit 110 and the second execution unit 120 are configured to perform communication with each other. The first execution unit 110 includes a CPU 111 and memory 112. The memory 112 stores a control program executed by the CPU 111. The second execution unit 120 includes a CPU 121 and memory 122. The memory 122 stores a control program executed by the CPU 121.

When predetermined execution conditions are met, the first execution unit 110 executes a catalyst warming process that warms the catalyst 35. In the catalyst warming process, the first execution unit 110 operates the engine 11 so that exhaust gas having higher temperature than when the catalyst warming process is not executed is discharged from the cylinders 21 into the exhaust passage 28. For example, in the catalyst warming process, the first execution unit 110 retards the ignition timing from that of when the catalyst warming process is not executed.

Further, prior to execution of the catalyst warming process, the first execution unit 110 requests the second execution unit 120 to prohibit disengagement of the clutch 12.

When receiving the request for prohibiting disengagement of the clutch 12 from the first execution unit 110, the second execution unit 120 maintains the clutch 12 in the engaged state so that the motor generator 13 remains connected to the crankshaft 22. Further, the second execution unit 120 has the motor generator 13 output regenerative torque so that the engine speed Ne does not increase rapidly during execution of the catalyst warming process. The regenerative torque is output torque of the motor generator 13 acting in a direction hindering rotation of the crankshaft 22.

A routine executed by the first execution unit 110 to warm the catalyst 35 will now be described with reference to FIG. 2. A control program corresponding to the routine is executed by the CPU 111 in predetermined control cycles.

In step S11 of the routine, the first execution unit 110 determines whether the vehicle is at a standstill. For example, the first execution unit 110 determines that the vehicle is at a standstill when the duration in which the vehicle speed SP, detected by the speed sensor 60 as being less than or equal to a standstill determination speed, is greater than or equal to a determination time. When the duration is less than the determination time, the first execution unit 110 determines that the vehicle is not at a standstill. When determining that the vehicle is not at a standstill (S11: NO), the first execution unit 110 proceeds to step S27. When determining that the vehicle is at a standstill (S11: YES), the first execution unit 110 proceeds to step S13.

In step S13, the first execution unit 110 determines whether the catalyst temperature Tc detected by the catalyst temperature sensor 65 is less than a lower limit TcLL of an activation temperature range. When the catalyst temperature Tc is within the activation temperature range, the catalyst 35 can sufficiently purify exhaust gas. When the catalyst temperature Tc is not within the activation temperature range, the catalyst 35 may not be able to sufficiently purify the exhaust gas. Thus, when the catalyst temperature Tc is less than the lower limit TcLL, a catalyst warming process is executed to warm the catalyst 35. When the catalyst temperature Tc is greater than or equal to the lower limit TcLL, the catalyst warming process does not need to be executed. Thus, when the catalyst temperature Tc is greater than or equal to the lower limit TcLL (S13: NO), the first execution unit 110 proceeds to step S29. When the catalyst temperature Tc is less than the lower limit TcLL (S13: YES), the first execution unit 110 proceeds to step S15. Specifically, the first execution unit 110 proceeds to step S15 when determining that predetermined execution conditions are met when the hybrid electric vehicle 10 is at a standstill and the catalyst temperature Tc is less than the lower limit TcLL.

In step S15, the first execution unit 110 determines whether a clutch disengagement flag FLG1 is set to ON. The clutch disengagement flag FLG1 is used to determine whether a request for prohibiting disengagement of the clutch 12 has been sent to the second execution unit 120. When the clutch disengagement flag FLG1 is set to ON, a request for prohibiting disengagement of the clutch 12 has been sent to the second execution unit 120. When the clutch disengagement flag FLG1 is not set to ON, a request for prohibiting disengagement of the clutch 12 has not been sent to the second execution unit 120. When the clutch disengagement flag FLG1 is not set to ON (S15: NO), the first execution unit 110 proceeds to step S17.

In step S17, the first execution unit 110 requests the second execution unit 120 to engage the clutch 12. Specifically, the first execution unit 110 sends a request for prohibiting disengagement of the clutch 12 to the second execution unit 120. In step S19, the first execution unit 110 sets the clutch disengagement flag FLG1 to ON. Then, the first execution unit 110 ends the routine.

In step S15, when the clutch disengagement flag FLG1 is set to ON (YES), the first execution unit 110 proceeds to step S21. In step S21, the first execution unit 110 determines whether the clutch 12 is disengaged based on information received from the second execution unit 120. When determining that the clutch 12 is not disengaged (S21: NO), the first execution unit 110 proceeds to step S23.

In step S23, the first execution unit 110 executes the catalyst warming process. Specifically, the first execution unit 110 executes the catalyst warming process on condition that the clutch 12 is engaged. Then, the first execution unit 110 ends the routine.

When determining that the clutch 12 is disengaged (YES) in step S21, the clutch 12 is disengaged even though disengagement of the clutch 12 has been prohibited. Thus, the first execution unit 110 proceeds to step S25 and determines that there is an anomaly. Specifically, the first execution unit 110 determines that clutch 12 cannot be engaged because there is an anomaly in the clutch 12 or in an actuator for moving the clutch 12. The first execution unit 110 then proceeds to step S27.

In step S27, the first execution unit 110 ends execution of the catalyst warming process. Then, the first execution unit 110 proceeds to step S29.

In step S29, the first execution unit 110 sets the clutch disengagement flag FLG1 to OFF. Then, the first execution unit 110 ends the routine.

A routine executed by the second execution unit 120 when the catalyst warming process is executed by the first execution unit 110 will now be described with reference to FIG. 3. A control program for the routine is executed by the CPU 121 in predetermined control cycles when the catalyst warming process is executed.

In step S41 of the routine, the second execution unit 120 obtains the state of the clutch 12. The state of the clutch 12 obtained in this case is whether the clutch 12 is disengaged or engaged. For example, if the clutch 12 is hydraulically driven, the second execution unit 120 obtains the state of the clutch 12 based on the hydraulic pressure generated by the actuator of the clutch 12. Further, if the clutch 12 is electromagnetically driven, the second execution unit 120 obtains the state of the clutch 12 based on the amount of current flowing through the actuator of the clutch 12.

In step S43, the second execution unit 120 sends the state of the clutch 12, which was obtained in step S41, to the first execution unit 110. The first execution unit 110 determines whether the clutch 12 is disengaged (S21) based on the state of clutch 12 sent in step S43. After sending the state of the clutch 12 to the first execution unit 110, the second execution unit 120 ends the routine.

Operation and Advantages of Present Embodiment (1) When the clutch 12 is engaged and the motor generator 13 is connected to the crankshaft 22, the motor generator 13 can apply load to the engine 11. The first execution unit 110 executes the catalyst warming process after requesting the second execution unit 120 to prohibit disengagement of the clutch 12. Thus, the first execution unit 110 executes the catalyst warming process in a state in which output torque of the motor generator 13 can be transmitted to the crankshaft 22. In other words, the catalyst warming process is executed in a state in which the motor generator 13 applies load to the engine 11. This avoids a situation in which the engine speed Ne increases rapidly when the catalyst warming process is executed.

In the present embodiment, the catalyst warming process is executed when the hybrid electric vehicle 10 is at a standstill. In other words, the catalyst warming process is executed when the engine speed Ne is adjustable by the motor generator 13. When the hybrid electric vehicle 10 starts moving, the catalyst warming process ends because the engine speed Ne can no longer be adjusted by the motor generator 13.

(2) The catalyst warming process starts when the clutch 12 is engaged and the motor generator 13 is connected to the crankshaft 22. This avoids a situation in which the engine speed Ne increases rapidly when the catalyst warming process starts.

(3) During execution of the catalyst warming process, a situation in which the clutch 12 becomes disengaged may occur. In the present embodiment, when the clutch 12 is disengaged during execution of the catalyst warming process, the catalyst warming process ends. Thus, the engine 11 will not be operated to warm the catalyst 35 when the motor generator 13 is disconnected from the crankshaft 22.

(4) When the clutch 12 is disengaged even though the first execution unit 110 is requesting the second execution unit 120 to prohibit disengagement of the clutch 12, there may be an anomaly in the clutch 12 or the actuator of the clutch 12. Thus, in the present embodiment, when the clutch 12 is disengaged during execution of the catalyst warming process, the first execution unit 110 determines that there is an anomaly. In other words, an anomaly in the clutch 12 or the actuator of the clutch 12 is detected during execution of the catalyst warming process.

(5) When the catalyst warming process is executed, the motor generator 13 outputs regenerative torque. This allows for adjustment of the load applied to the engine 11. Thus, a situation in which the engine speed Ne increases rapidly when the catalyst warming process is executed is further effectively avoided.

The engine 11 will have a higher engine load factor KL during an operation state when the motor generator 13 is controlled to output regenerative torque. This raises the temperature of exhaust gas discharged from the cylinders 21 to the exhaust passage 28 and completes warming of the catalyst 35 earlier.

Modifications

The above-described embodiment may be modified as follows. The above-described embodiment and the following modifications can be combined as long as the combined modifications remain technically consistent with each other.

The catalyst warming process may include control other than the ignition timing retardation as long as the temperature of exhaust gas discharged from the cylinders 21 to the exhaust passage 28 is raised as compared with when the catalyst warming process is not executed. For example, stratified charge combustion may be performed in the cylinders 21 during the catalyst warming process.

The step of determining that there is an anomaly when the clutch 12 is disengaged during execution of the catalyst warming process may be omitted. That is, step S25 may be omitted from the routine shown in FIG. 2.

During execution of the catalyst warming process, the motor generator 13 does not need to be controlled to output regenerative torque so that the engine rotation speed Ne does not increase. This is because the load applied to the crankshaft 22 increases when the clutch 12 is engaged and the motor generator 13 is connected to the crankshaft 22 as compared with when the clutch 12 is disengaged. As the load applied to the crankshaft 22 increases, the engine speed Ne is less likely to increase.

Figure 2:
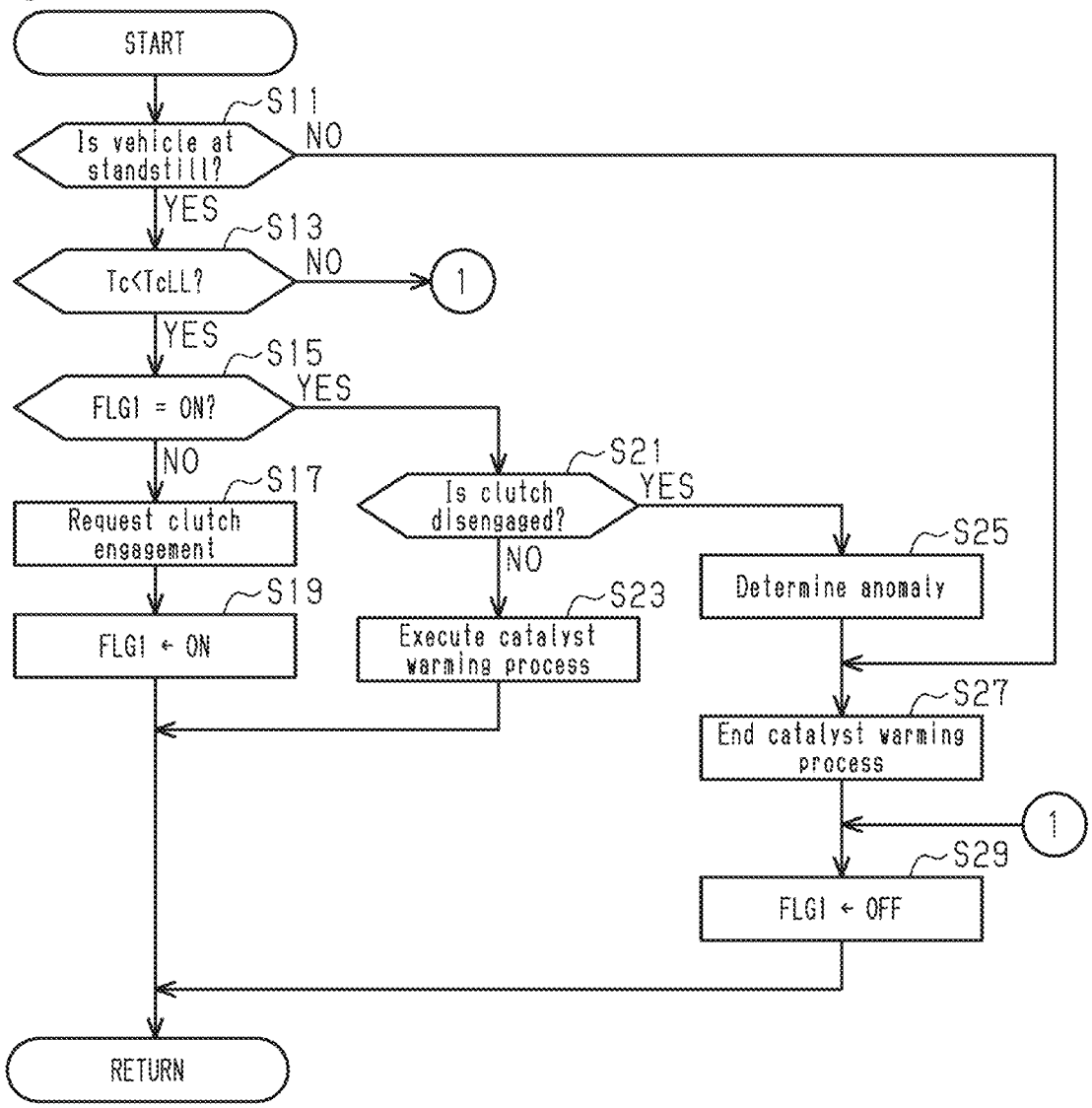
FIG. 2 is a flowchart showing a routine executed by a first execution unit of the controller.
Figure 3:
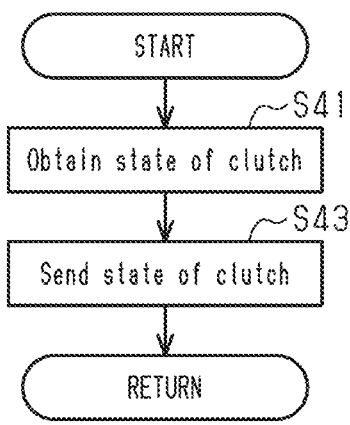
FIG. 3 is a flowchart showing a routine executed by a second execution unit of the controller.

In the above embodiment, as shown in FIG. 2, when the catalyst temperature Tc becomes greater than or equal to the lower limit TcLL during execution of the catalyst warming process, the execution of the catalyst warming process continues until the hybrid electric vehicle 10 starts moving. Instead, when the catalyst temperature Tc becomes greater than or equal to the lower limit TcLL during execution of the catalyst warming process (S13: NO), the first execution unit 110 may proceed to step S27 to end the execution of the catalyst warming process.

The drive system of the hybrid electric vehicle 10 may include a starter motor.

The execution units 110, 120 do not have to include a CPU and ROM when executing a software processing. Specifically, the execution units 110, 120 may have any one of the following configurations (a) to (c).

(a) The execution units 110, 120 include a software executing device serving as a processor that executes various types of processes according to a computer program. The processor includes a CPU and memory such as RAM and ROM. The memory stores program codes or instructions configured to cause the CPU to execute processes. The memory, or computer readable media, include any type of media that are accessible by general-purpose computers and dedicated computers.

(b) The execution units 110, 120 include one or more dedicated hardware circuits that executes various types of processes. Examples of the dedicated hardware circuits include an application specific integrated circuit such as ASIC or FPGA. ASIC is an acronym for an application specific integrated circuit, and FPGA is an acronym for a field programmable gate array.

(c) The execution units 110, 120 include a processor that executes part of various types of processes according to a computer program and a dedicated hardware circuit that executes the remaining part of the various types of processes. In other words, the above processes may be executed by processing circuitry that includes at least one of a software executing device and a dedicated hardware circuit.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A hybrid electric vehicle controller for a hybrid electric vehicle, wherein the hybrid electric vehicle includes an engine that includes a crankshaft and an exhaust passage, a motor generator, a clutch arranged between the crankshaft and the motor generator, and a catalyst arranged in the exhaust passage, the hybrid electric vehicle controller comprising:
first circuitry configured to execute a catalyst warming process that warms the catalyst under a situation in which the hybrid electric vehicle is at a standstill; and
second circuitry configured to control the clutch to be in an engaged state where the motor generator is connected to the crankshaft and in a disengaged state where the motor generator is disconnected from the crankshaft,
wherein
the first circuitry is configured to:
when a catalyst temperature is not within an activation temperature range, start the catalyst warming process in response to the clutch being in the engaged state where the motor generator is connected to the crankshaft; and
when the catalyst temperature is within the activation temperature range, end the catalyst warming process in response to the clutch being in the disengaged state where the motor generator is disconnected from the crankshaft, and
the first circuitry is further configured to
request the second circuitry to prohibit disengagement of the clutch in response to the catalyst warming process being executed, and
set a clutch disengagement flag to determine whether the second circuitry has been requested to prohibit disengagement of the clutch until the catalyst temperature is within the activation temperature range.

2. The hybrid electric vehicle controller according to claim 1, wherein the second circuitry is configured to control the motor generator to output torque to avoid a situation in which a rotation speed of the crankshaft increases when the first circuitry executes the catalyst warming process.

3. The hybrid electric vehicle controller according to claim 1, wherein the first circuitry is configured to determine whether the catalyst temperature is less than a lower limit of the activation temperature range in response to the hybrid electric vehicle is being at the standstill.

4. The hybrid electric vehicle controller according to claim 3, wherein the first circuitry is configured to, in response to the catalyst temperature being less than the lower limit of the activation temperature range, determine whether the clutch disengagement flag is on to indicate that the second circuitry has been requested to prohibit disengagement of the clutch until the catalyst temperature is within the activation temperature range.

5. The hybrid electric vehicle controller according to claim 4, wherein the first circuitry is configured to, in response to the clutch disengagement flag being on, determine whether the clutch is in the disengaged state even though the second circuitry has been requested to prohibit disengagement of the clutch until the catalyst temperature is within the activation temperature range.

6. The hybrid electric vehicle controller according to claim 5, wherein the first circuitry is configured to, in response to determining that the clutch is in the disengaged state, determine that there is an anomaly in the clutch.

7. The hybrid electric vehicle controller according to claim 6, wherein the first circuitry is configured to, in response to the anomaly being determined, end the catalyst warming process and set the clutch disengagement flag off.

8. A hybrid electric vehicle controller for a hybrid electric vehicle, wherein the hybrid electric vehicle includes an engine that includes a crankshaft and an exhaust passage, a motor generator, a clutch arranged between the crankshaft and the motor generator, and a catalyst arranged in the exhaust passage, the hybrid electric vehicle controller comprising:
first circuitry configured to execute a catalyst warming process that warms the catalyst under a situation in which the hybrid electric vehicle is at a standstill; and
second circuitry configured to control the clutch to be in an engaged state where the motor generator is connected to the crankshaft and in a disengaged state where the motor generator is disconnected from the crankshaft,
wherein
the first circuitry is configured to:
when a catalyst temperature is not within an activation temperature range, start the catalyst warming process in response to the clutch being in the engaged state where the motor generator is connected to the crankshaft; and
when the catalyst temperature is within the activation temperature range, end the catalyst warming process in response to the clutch being in the disengaged state where the motor generator is disconnected from the crankshaft, and
wherein the first circuitry is further configured to determine that there is an anomaly in response to the clutch being in the disengaged state where the motor generator is disconnected from the crankshaft during execution of the catalyst warming process.

9. A method for controlling a hybrid electric vehicle, wherein the hybrid electric vehicle includes an engine that includes a crankshaft and an exhaust passage, a motor generator, a clutch arranged between the crankshaft and the motor generator, and a catalyst arranged in the exhaust passage, the method comprising:
executing a catalyst warming process that warms the catalyst under a situation in which the hybrid electric vehicle is at a standstill; and
controlling the clutch to be in an engaged state where the motor generator is connected to the crankshaft and in a disengaged state where the motor generator is disconnected from the crankshaft,
wherein the method further comprises:
when a catalyst temperature is not within an activation temperature range, starting the catalyst warming process in response to the clutch being in the engaged state where the motor generator is connected to the crankshaft, and
when the catalyst temperature is within the activation temperature range, ending the catalyst warming process in response to the clutch being in the disengaged state where the motor generator is disconnected from the crankshaft, and
wherein the method further comprises
requesting prohibition of disengagement of the clutch in response to the catalyst warming process being executed and
setting a clutch disengagement flag to determine whether the prohibition of disengagement of the clutch has been requested until the catalyst temperature is within the activation temperature range.

* * * * *